UNITED STATES PATENT OFFICE.

JAMES EDWARD PORTER, OF SYRACUSE, NEW YORK, ASSIGNOR TO GENERAL FILTRATION COMPANY, INC., OF ROCHESTER, NEW YORK, A CORPORATION OF NEW YORK.

FILTERING MEDIUM.

1,118,441.          Specification of Letters Patent.          Patented Nov. 24, 1914.

No Drawing.    Original application filed May 9, 1913, Serial No. 766,522.    Divided and this application filed April 9, 1914. Serial No. 830,804.

*To all whom it may concern:*

Be it known that I, JAMES EDWARD PORTER, of Syracuse, in the county of Onondaga, in the State of New York, have invented new and useful Improvements in Filtering Mediums, of which the following, taken in connection with the accompanying drawings, is a full, clear, and exact description.

This invention relates to certain improvements in porous mineral products of the class shown and described in my pending application Serial No. 766,522, filed May 9, 1913, of which this application is a division, adapted to be made any desired size, form or degree of porosity according to the use to which it is to be put and while it is intended more particularly as a rapid filtering medium, it will be evident from the following description that it may be applied to many other uses in various arts and industries.

The main object is to produce at a comparatively low cost a highly coherent mineral body of any desired form, size or density having a uniform or graded degree of porosity and practically indestructible by acids, alkalis and other liquids, as well as by gases or vapors under widely varying degrees of heat and cold.

In other words, I have sought to advance the art of making porous products by thoroughly mixing certain mineral constituents in a more or less finely comminuted state according to the degree of porosity desired and by fusing the comminuted particles of one of the constituents of the mixture so as to establish a firm and tenacious bond between such particles and at the same time assuring a uniform degree of porosity throughout the entire body.

A further object is to produce such a porous product in which the expansion of the mass is counter-acted to retain the articles in the same shape as molded or compressed.

Another object is to be able to produce a rapid filtering body of great strength and little resistance by superimposing in the course of manufacture, a thin layer of dense but highly porous material upon a thick layer of much coarser but highly porous structure.

Other objects and uses will be brought out in the following description.

The material employed in the manufacture of this porous mineral product preferably consists of ground or crushed quartz, sand, or similar silica-containing substances which may be comminuted to any desired degree and according to the degree of porosity required, the comminuted particles being thoroughly mixed with a quantity of similarly comminuted powdered glass and then bound together by the fusion of the glass. This glass may be added as such in a finely powdered or granular form or in the form of its constituents which become glass at the proper temperature.

The sand and quartz or similar silica containing substances may be mixed dry with the finely powdered or granular glass or its constituent in varying proportions according to the nature of the article which it may be desired to manufacture, the thinner bodies or articles requiring more of the flux or fusible constituent as glass than the thicker bodies or articles in order to give such thinner bodies the desired strength.

The dry mixture may be contained in suitable molds and heated therein above the fusing point of the glass or the dry mixture may be further mixed with sufficient water and, if necessary some adhesive substance of organic origin such as dextrin, gum arabic or the like so that the articles can be molded by pressure and then removed from the molding press and placed in suitable molds or saggers for burning. This material made according to my process may be heated very much above the fusing point of the glass without detriment. In fact with the comparatively small amount of binder (glass) which I use, the mixture may be heated to 2800° F. or higher with the most beneficial results. In this latter case, about 10% of water and 1% or less of the adhesive matter are ordinarily sufficient, the adhesive being driven off or destroyed in the burning and is only used to make the mass coherent while handling during the course of manufacture.

In making certain shaped articles by either the dry or wet mixture method a suitable percentage of a selected grade of infusorial earth (also known as kieselguhr or fossil meal), may be added to the composition to counteract the expansion of the mass in fusion, thus enabling the finished article to be readily removed from the molds in the size or shape desired.

As an example of an ideal product, 80% of clean white quartz sand of suitable mesh and 20% of finely powdered glass may be employed, these constituents being mixed thoroughly, molded either dry or wet and then fired above the fusing point of the glass.

If ground common window glass is used, the mixture should be heated up to about 1155° C. (2111° F.). The different lots of ground glass used may, of course, vary in their fusing points but an observant attendant can distinguish when this point is reached. The fusing point is not, therefore, confined to any specific temperature nor is the invention limited to the above proportioned mixture for the reasons given and for the further reason that a variation in the proportion of the constituents is required to produce the desired porosity, that is coarse or fine pores. It is evident, however, that variation in the proportions of the sand and glass as well as variation in the mesh of the sand itself may be necessary to control these latter factors.

As an example of a product made from glass forming constituents the following may be given:

75 parts of clean, white, quartz sand, of suitable mesh and 25 parts of the following mixture.

18 parts of finely pulverized silica (same sand as above may be used, but it should be finely powdered).
6 parts dry carbonate of soda.
5.75 parts carbonate of lime.
---
29.75 parts.

These three ingredients are thoroughly mixed together in the powdered form, and this mixture then mixed with the 75 parts of sand.

This formula as a whole is for a porous composition consisting of about 75% sand and about 25% glass. To make this 25 parts of glass approximately 18 parts of silica, 6 parts of carbonate of soda and 5.75 parts of carbonate of lime are required. The apparent excess of 4.75 parts is given off as carbon dioxid ($CO_2$) when these ingredients react chemically, under the influence of heat, to form glass. With chemically pure carbonate of lime and carbonate of soda, 5.02 parts of carbon dioxid would be given off under theoretical conditions from the above specified amounts of lime and soda, thus producing but 24.73 parts of glass instead of 25 parts. But none of the materials employed would be chemically pure and theoretical conditions are not always obtainable, consequently allowance was made in the formula given for commercial salts and practical conditions.

The following equations and calculations should make the matter clear:

2.49 parts of $CO_2$ are produced from 6 parts carbonate of soda, 2.53 parts of $CO_2$ are produced from 5.75 parts carb. of lime, 5.02 parts of $CO_2$ (total) are therefor produced from both of these ingredients, and given off as a gas during the heating. The sodium oxid ($Na_2O$) and calcium oxid ($CaO$) of course combine with the silica to form glass, and said glass simultaneously with its formation, binds the 75 parts of sand together to produce the porous product. In this latter method of manufacture, the reaction between the glass-forming constituents commences about 1040° C. (1904° F.) and apparently ends about 1200° C. (2192° F.) and the temperature should be maintained near this latter point for a few hours to insure the complete formation of the glass and the elimination of the decomposition products of the reaction ($CO_2$). While this latter method requires more time and attention than the former, it produces products practically identical when properly carried out, and may be used in case supplies of waste glass are not available.

This porous mineral product may also be made up in layers of varying porosity. For example, a plate say two inches thick over all, may have one and one-half inches of coarse sand as a base, and one-half inch of very fine sand for the remainder. Each grade of sand being mixed separately with the binding agent and placed in layers in the mold, so that upon fusion a single plate, coarse grained on one side and fine grained on the other is obtained. For some filtration operations a very fine pored plate may be required and as the resistance of the plate as a whole is decreased by having but one-half inch instead of two inches of fine media for the liquid to pass through, this feature is of importance. At the same time a two-inch plate may be required to sustain the weight or pressure put upon it. Composite plates or products, having for instance a layer of porous carbonaceous matter between two layers of sand may also be made up on the same general principle. Or catalytic substance may be incorporated in the intermediate layer or compartment, or even incorporated top, bottom, or throughout, as may be desired. Extra large plates or shapes may also be reinforced by embedding in the mixture during the molding, metal rods or other suitable reinforcing material.

The porous mineral product is as acid-proof as either of its constituents (silica glass) which is practically absolute, and as a rapid filter medium for hot strong acids is especially adapted. As is well known, hot strong alkalis attack silica and glass to some extent, but the material is nevertheless extremely serviceable for all ordinary uses in this line.

As a rapid filtering medium for neutral, acid, or alkaline liquids or solutions, either hot or cold, and for the filtration or purification of air, gases, fumes or vapors, the above described porous mineral product is practically indestructible. As a means of agitating and aerating liquids or emulsions, as in the cyanid process of extracting ores, this porous product when installed as a false bottom in tanks, is particularly efficient. It may also be used as a container for moisture, as in humidors, and for other liquids as acetone in gas cylinders, and also as a medium suitable for impregnation with catalytic substances used in the manufacturing processes or as a means for finely dividing gases or liquids in the manufacture of chemicals, as for example, the saturation of ammoniacal brine liquors with $CO_2$ in the manufacture of soda, or the saturation of water with $SO_3$ in the manufacture of sulfuric acid. In other operations requiring a heat, acid, and alkali resisting material of a porous nature, this material is admirably adapted. Owing to its numerous air cells, it is also an efficient heat and cold insulating material and for the dry concentration of ores, it affords an ideal means for the distribution of air.

What I claim is:

1. A rapid filtering medium formed solely of a quantity of sand mixed with a relatively small quantity of infusorial earth and fused together by less than half the quantity of powdered glass.

2. A rapid filtering medium having strata of different densities, the stratum of one density being formed solely of a quantity of sand mixed with a relatively small quantity of infusorial earth and fused together by less than half the quantity of powdered glass.

In witness whereof I have hereunto set my hand this 6th day of April, 1914.

JAMES EDWARD PORTER.

Witnesses:
H. E. CHASE,
EVA E. GREENLEAF.